(12) United States Patent
Weidmann

(10) Patent No.: US 7,357,830 B2
(45) Date of Patent: Apr. 15, 2008

(54) DEVICE FOR DEHUMIDIFYING ROOM AIR

(75) Inventor: Urs A Weidmann, Zug (CH)

(73) Assignee: Imes Management AG, Cham (CH)

( * ) Notice: Subject to any disclaimer, the term of this patent is extended or adjusted under 35 U.S.C. 154(b) by 366 days.

(21) Appl. No.: 10/953,525

(22) Filed: Sep. 30, 2004

(65) Prior Publication Data

US 2005/0072303 A1    Apr. 7, 2005

(30) Foreign Application Priority Data

Oct. 1, 2003    (EP)    ................................. 03405708

(51) Int. Cl.
*B01D 53/22*    (2006.01)
(52) U.S. Cl. ............................ 96/7; 96/4; 95/45; 95/52
(58) Field of Classification Search ...................... 96/4, 96/6, 7, 228, 9; 95/43, 45, 52; 165/59, 60; 210/321.6, 321.72
See application file for complete search history.

(56) References Cited

U.S. PATENT DOCUMENTS

| | | | |
|---|---|---|---|
| 3,839,200 A * | 10/1974 | Gigou et al. ................. 252/364 |
| 4,397,226 A * | 8/1983 | Lind ............................. 454/66 |
| 4,633,936 A | 1/1987 | Nilsson |
| 5,641,337 A * | 6/1997 | Arrowsmith et al. ........... 95/52 |
| 6,178,966 B1 * | 1/2001 | Breshears .................... 126/702 |
| 6,228,145 B1 * | 5/2001 | Falk-Pedersen et al. ....... 95/44 |
| 6,887,303 B2 * | 5/2005 | Hesse et al. ..................... 96/8 |
| 2002/0096312 A1 * | 7/2002 | Korin ........................... 165/58 |
| 2002/0185266 A1 * | 12/2002 | Dobbs et al. ................ 165/166 |

FOREIGN PATENT DOCUMENTS

| | | |
|---|---|---|
| DE | 198 16 185 C1 | 6/1999 |
| EP | 1 052 458 A2 | 11/2000 |
| EP | 1 025 485 A3 | 12/2002 |
| WO | WO 0244624 A1 * | 6/2002 |

* cited by examiner

*Primary Examiner*—Duane Smith
*Assistant Examiner*—Robert A Clemente
(74) *Attorney, Agent, or Firm*—Browdy and Neimark

(57) ABSTRACT

A device for dehumidifying room air has a chamber consisting of at least one first cavity (1) and at least one second cavity (2). The cavities are separated by at least one water-permeable and/or water-vapor-permeable structure (3), these structures (3) lying in each case in the direction of the fluid streams flowing through the cavities (1, 2) of the chamber. In this case, a first air stream (11, 12) which is to be dehumidified flows through the first cavity (1). The second cavity (2), with its second air stream (13, 14), at least partly absorbs the moisture extracted from the first stream.

19 Claims, 3 Drawing Sheets

DEVICE FOR DEHUMIDIFYING ROOM AIR

Figure 1:
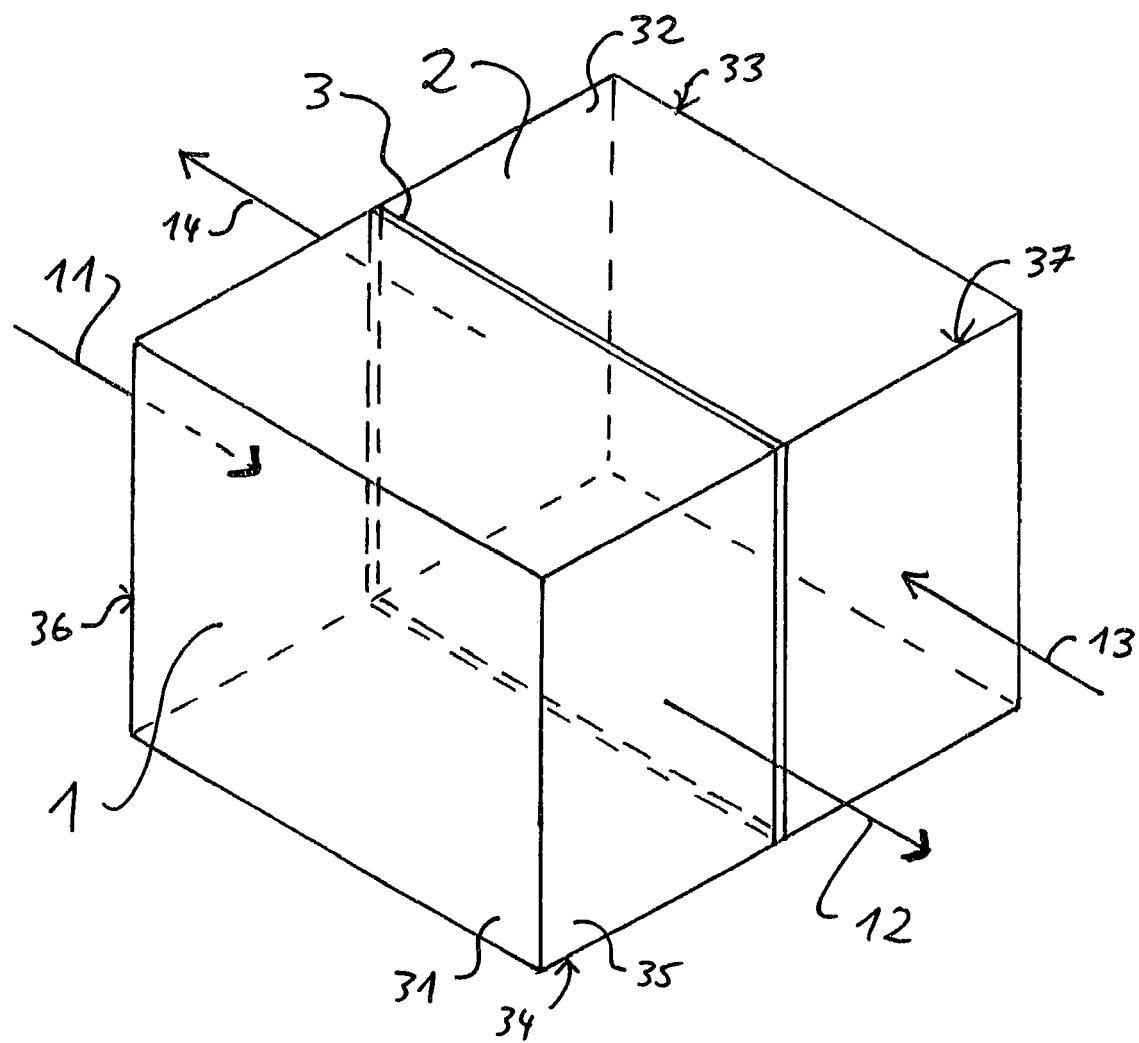

The invention relates to a device for dehumidifying room air.

A technical feature of such processes is the avoidance of condensation on the devices and the construction of elements for discharging the water. Such a device has been disclosed by DE 198 16 185 C1, in which indirect absorption is achieved through the use of a water-permeable and/or water-vapor-permeable structure, the water changing into a hygroscopic cooling liquid. This requires an additional complicated cooling circuit.

Since the first half of the twentieth century, the prior art has disclosed a number of rotating heat exchangers, with which the room-air moisture in an outgoing-air volume is removed from the outgoing air and fresh incoming air is supplied. It is thus possible to transmit the heat and moisture in the outgoing air directly into the incoming air without having to take a roundabout way via the condensation of the water or of the water vapor. An advantageous method for producing such a heat exchanger has been published in EP 0 159 986 (U.S. Pat. No. 4,633,936). This heat exchanger consists of two areas which are wound in a spiral in order to form the heat exchanger rotor. Groups of passages are therefore formed in the longitudinal axis direction, these passages alternately letting through the warm air stream to be cooled and the cold air stream to be heated. The water adhesion on materials without condensation is used here. The dehumidification can be regulated to a certain extent using the drum speed, but this has a direct effect on the noise level.

A disadvantage in this case, for example, is that these devices comprise a number of movable parts, which are accordingly subject to maintenance and wear.

Furthermore, it is disadvantageous, for example, in residential buildings that odor substances are also transmitted with the moisture into the fresh room air.

Based on this prior art, the object of the invention is to improve a device of the type mentioned at the beginning in such a way that it can be constructed in a simpler manner and in a more favorable manner in terms of energy, and moisture transfer proceeds as far as possible free of odors. In particular, the aim of the invention is to specify a low-wear and low-noise water dehumidifier for the ventilation of living spaces.

Such a device is defined by the features of claim 1.

A water-permeable and/or water-vapor-permeable structure refers to a diaphragm, foil or porous structure which, when different partial pressures are present on the two sides of the structure, allows water and/or water vapor to pass through, but essentially does not allow other substances or gases to pass through. In conditions in which there is, for example, a temperature of around 30 degrees Celsius and a partial pressure difference in the order of magnitude of 100 millibar, a permeability of 10 to 20 meters per hour and bar can be achieved.

Further advantageous exemplary embodiments are defined in the subclaims.

Figure 2:
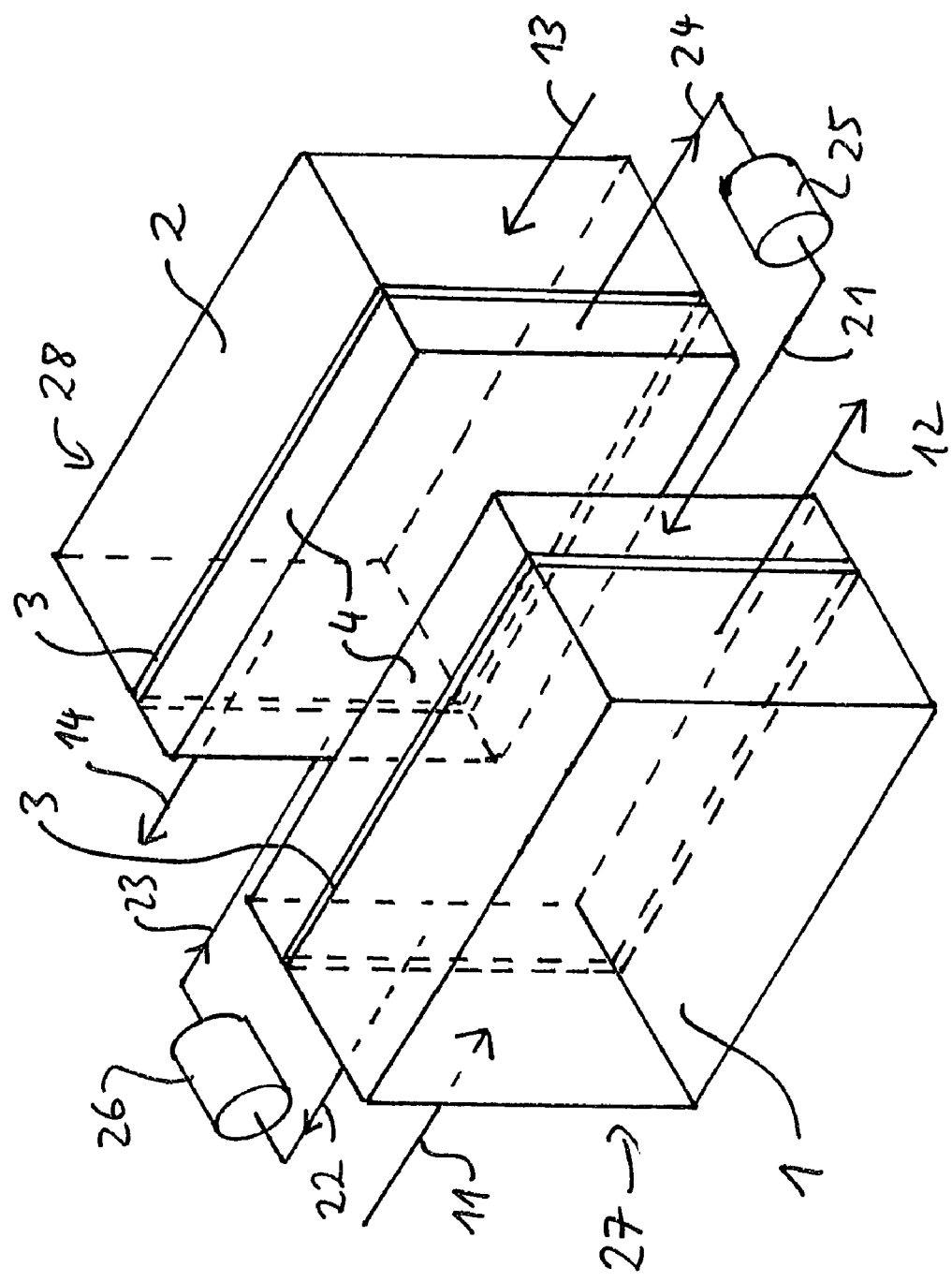
Figure 3:
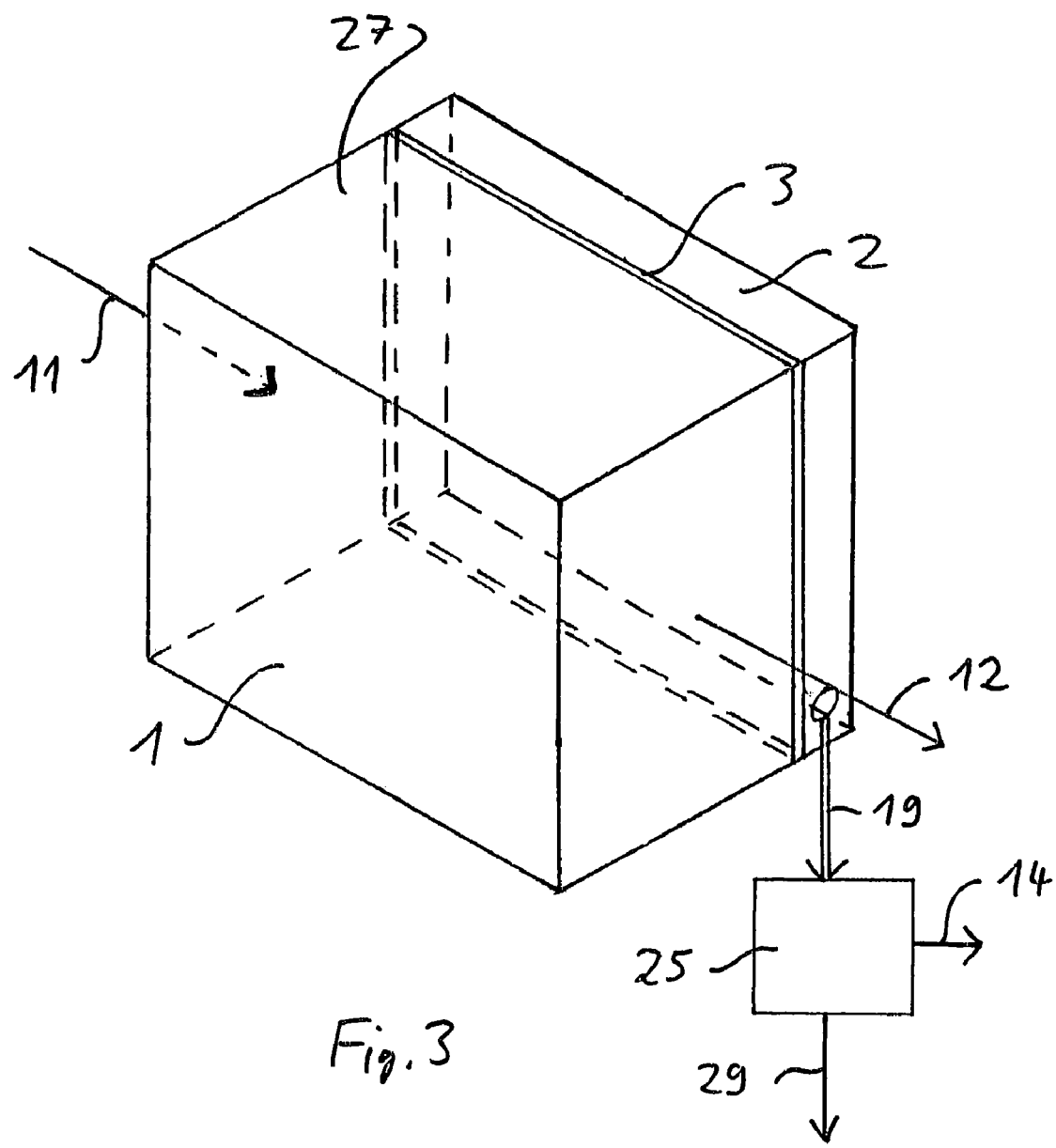

The invention will now be described in more detail by way of example with exemplary embodiments and with reference to the drawing, in which:

FIG. 1 shows a schematic perspective view of a device according to a first exemplary embodiment of the invention in the form of a diagrammatic sketch, FIG. 2 shows a schematic perspective view of a device according to a second exemplary embodiment of the invention in the form of a diagrammatic sketch, and FIG. 3 shows a schematic perspective view of a device according to a third exemplary embodiment of the invention in the form of a diagrammatic sketch.

FIG. 1 shows a schematic perspective view of a device according to a first exemplary embodiment of the invention in the form of a diagrammatic sketch. The device for dehumidifying room air has an elongated volume, which has openings only at two opposite mouths. The diagrammatic illustration of a section of such a volume is shown in FIG. 1. Said volume has at least one first cavity 1 and at least one second cavity 2, which are separated by at least one water-permeable and/or water-vapor-permeable diaphragm 3. Any diaphragm or sheet-like structure which lets water or water vapor through but provides a barrier against gases and other molecules can be used in principle. Such a structure may also be a porous rigid material. Other molecules may involve in particular kitchen or wet-room odors in the domestic environment.

In the exemplary embodiment shown, the cavities 1 and 2 are surrounded on four sides 31, 32, 33 and 34 by "hard" impermeable walls, so that the cavities 1 and 2 appear to be a tube. The diaphragm 3 is mounted in between as a partition wall. It lies in each case in the direction of fluid flows 11, 12, 13, 14 flowing through the cavities 1, 2. In this case, a first air stream 11, 12 to be dehumidified can flow through the first cavity 1. A second air stream 13, 14 can flow through the second cavity 2. In the process, however, the air streams advantageously need not run in counterflow as shown in FIG. 1.

Some of the air streams 11 to 14 are advantageously connected to at least one pump which keeps the air streams in motion and thus supplies and discharges air. The mouths of the "tube", here the sides 35 and 36 in the diagrammatic sketch, need not lie side by side. An essential factor, however, is the size of the area spanned by the diaphragm 3, so that the tube is frequently and advantageously directed in a meander shape. The height of the air column disposed across the diaphragm, that is to say the height which corresponds to the length of the edge designated by 37, may be 1 to 5 centimeters for example. It must not become too large in order to enable the air to reach the diaphragm surface for the water exchange. The dehumidification can be directly controlled by controlling the velocity of the one (11, 12) or the other (13, 14) air stream.

The air streams in air-conditioning engineering may be designated, for example, as: external air 11 and incoming air 12 to the rooms and outgoing air 13 from the rooms and exhaust air 14 to be delivered into the environment.

Moisture recovery by a stationary, selectively permeable diaphragm is provided for by the device according to FIG. 1.

In an exemplary embodiment not shown in the figures, the walls 31 and 33 are not impermeable walls but likewise consist of diaphragm material 3. A plate-type configuration is then obtained by analogy with a plate-type heat exchanger, a cavity 1 for the air stream 11, 12 always being separated from a cavity 2 for the air stream 13, 14 in a side-by-side arrangement. This increases the possibility of increasing the air column of the edge length 37 disposed across the diaphragm 3. The outgoing air 13 of high humidity always delivers this water/water vapor via the diaphragm 3 into the incoming air 12 which is supplied to the rooms.

FIG. 2 shows a schematic perspective view of a device according to a second exemplary embodiment of the invention in the form of a diagrammatic sketch. In this case, the same features are always provided with the same reference numerals.

Externally there are still the air streams 11, 12, 13 and 14, which assume the same functions as described above. In this exemplary embodiment, however, the dehumidification can be controlled to a great extent. Two exchanger modules 27 and 28 are now constructed separately. Each exchanger module 27 and 28 has the one cavity 1 or 2, respectively, and an additional exchange cavity 4. The bodies 27 and 28 need not in particular lie side-by-side as shown here. In particular, it is also possible for the cavities to be of sandwich construction, for example 1-4-1 or 2-4-2, so that an exchanger cavity 4 lies in each case between two air-stream cavities. A reduction in volume is also possible by a meander-shaped construction.

It is essential in the exemplary embodiment according to FIG. 2 for a second closed air circuit to have been constructed, this air circuit consisting of the air streams 21, 22, 23 and 24. The latter are driven by one or more pumps, here two pumps 25 and 26. The circulation rate in the closed circuit can be regulated, in particular within a range of between 0.5 and 20 times the air-stream velocity of the air streams 11, 12 and 13, 14. Thus high dehumidification can be achieved at high speed in the exchanger 28, this dehumidification correspondingly delivering the moisture in the exchanger 27 into the volume 2. Likewise, the dehumidifying can also be reduced by reducing the speed. The device is also advantageously operated in counterflow.

A further interesting operating mode of this arrangement occurs in summer. The pump 26 is shut off and check valves close in the air stream 22 and 23. The air streams 21 to 24 are brought together via a valve system. Pump 25 runs and delivers the air quantity from the cavities 4 into the exhaust air 14. Due to the vacuum in the cavities, both cavities 1 and 2 are dehumidified. This then results in the case, of interest for summer and high temperatures, where there are two dehumidified air streams if a vacuum effect is correspondingly produced by the pump 25, when check valves are provided in the region of 21 or 23, said dehumidified air streams permitting the following procedure. Water can then be delivered into the region of the exhaust air 14, a factor which, on the one hand, brings about a cooling effect directly by means of the water itself. On the other hand, and in particular, the temperature of the air stream 14 is reduced by evaporation cooling. The exhaust air 14 thus cools down through contact and through evaporation, and the temperature of the external air 11 is reduced via a heat exchanger (exhaust air/external air), this external air 11 thus being directed on hot summer days as cooler air into the rooms to be ventilated. The temperature can be reduced again by a further addition of water to the dry incoming air 12.

In other words, it may be noted for a device according to FIG. 2 that the dehumidification can be regulated, it being possible for the moisture transfer to be controlled in the same direction by speed control even if there is only a single ventilator 25 (ventilator 26 would have been omitted).

The closed internal circuit 21 to 24 permits in particular separation of the noises associated with the pumped circulation from the air streams associated with the living spaces of a ventilation solution and thus permits very simple noise insulation.

FIG. 3 shows a schematic perspective view of a device according to a third exemplary embodiment of the invention in the form of a diagrammatic sketch.

Externally, the air streams 11, 12 and 14 assume the same functions as described above for the other exemplary embodiments. However, the dehumidification is restricted to one branch. There is only one exchanger module 27. The exchanger module 27 has the cavities 1 and 2, which are again separated by the water-permeable and/or water-vapor-permeable diaphragm 3. However, the second cavity 2 is only connected via a line 19 to a pump 25, which at the same time comprises a condensation-water separator. The suction effect of the pump 25 therefore produces a vacuum in the cavity 2, thereby resulting in increased dehumidification. The corresponding condensation water 29 is separated and the drawn-in air is passed into the outgoing-air stream 14.

For all the exemplary embodiments, those which are shown in the figures and also those which are only mentioned in the text, and also those exemplary embodiments which result from the attached claims, it is essential that the cavities 1, 2 and/or 4 can be cleaned during an interruption in operation. In a simple development, said cavities have individual or several corresponding openings for inflows and outflows, into which, for example, water can be passed, so that the volume of the cavities fills completely with water. Then, by means of one or more additionally arranged heating elements, the water can be heated, for example, up to boiling point and can be kept at this temperature. After a period of, for example, 30 minutes to 1 hour, the water is then drained, so that particles deposited on the walls and in particular in the water-permeable structure, which may be a diaphragm or may also be porous, can be released from the latter or the other walls and drawn off. A sterilization effect of the diaphragm is also obtained.

In another cleaning method, UV lamps are provided which kill germs deposited in the structures. Coating of the foil with silver compounds is also possible in order to achieve corresponding sterility of the surfaces.

The invention claimed is:

1. A humidity exchange device comprising at least one first cavity and a first intermediate volume separated from said at least one first cavity by a first water-vapor-permeable structure, at least one second cavity and a second intermediate volume separated from said at least one second cavity by a second water-vapor-permeable structure, said first and second intermediate volume connected to one another by a closed air-stream circuit, the air-stream circuit configured to let only an air stream that is not heated or cooled by the excuange device flow in the air-stream circuit, the at least one first cavity and the first intermediate volume exchanging water-vapor between a first air stream flowing through the at least one first cavity and said air stream flowing in said closed air-stream circuit, and the at least one second cavity and the second intermediate volume exchanging water-vapor between a second air stream flowing through the at least one second cavity and said air stream flowing in said closed air-stream circuit.

2. The device of claim 1, further comprising means for regulating a flow velocity in said closed air-stream circuit.

3. The device of claim 2, wherein said at least one first cavity and said at least one second cavity have a meander shape.

4. The device of claim 3, further comprising means for adding a liquid to said first and/or second air stream in order to reduce a temperature of the respective first or second air stream, said means for adding a liquid arranged downstream of said at least one first cavity or said at least one second cavity, respectively.

5. The device of claim 2, further comprising means for adding a liquid to said first and/or second air stream in order to reduce a temperature of the respective first or second air stream, said means for adding a liquid arranged downstream of said at least one first cavity or said at least one second cavity, respectively.

6. The device of claim 2, further comprising a heat exchanger for exchanging heat between said first air stream at an upstream side of said at least one first cavity and said second air stream at a downstream side of said at least one second cavity.

7. The device of claim 2, further comprising means for producing a vacuum in the first and/or second intermediate volume.

8. The device of claim 2, wherein said water-vapor-permeable structure is permeable to water molecules but not to gas molecules and/or odor substances.

9. The device of claim 2, wherein said water-vapor-permeable structure is coated with silver compounds.

10. The device of claim 1, wherein said at least one first cavity and said at least one second cavity have a meander shape.

11. The device of claim 10, further comprising means for adding a liquid to said first and/or second air stream in order to reduce a temperature of the respective first or second air stream, said means for adding a liquid arranged downstream of said at least one first cavity or said at least one second cavity, respectively.

12. The device of claim 10, further comprising a heat exchanger for exchanging heat between said first air stream at an upstream side of said at least one first cavity and said second air stream at a downstream side of said at least one second cavity.

13. The device of claim 1, further comprising means for adding a liquid to said first and/or second air stream in order to reduce a temperature of the respective first or second air stream, said means for adding a liquid arranged downstream of said at least one first cavity or said at least one second cavity, respectively.

14. The device of claim 1, further comprising a heat exchanger for exchanging heat between said first air stream at an upstream side of said at least one first cavity and said second air stream at a downstream side of said at least one second cavity.

15. The device of claim 14, wherein said water-vapor-permeable-structure is coated with silver compounds.

16. The device of claim 1, further comprising means for producing a vacuum in the first and/or second intermediate volume.

17. The device of claim 1, wherein said water-vapor-permeable structure is permeable to water molecules but not to gas molecules and/or odor substances.

18. The device of claim 1, wherein said water-vapor-permeable structure is coated with silver compounds.

19. The device of claim 1, wherein said air stream flowing in said closed air-stream circuit flows in a direction counter to that of the first air stream and flows in a direction counter to that of the second air stream.

* * * * *